United States Patent
Duó et al.

(10) Patent No.: US 10,024,234 B2
(45) Date of Patent: Jul. 17, 2018

(54) PANELS OF A FAN OF A GAS TURBINE

(71) Applicant: Rolls-Royce Deutschland Ltd & Co KG, Blankenfelde-Mahlow (DE)

(72) Inventors: Pierangelo Duó, Berlin (DE); Karl Schreiber, Am Mellensee (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 272 days.

(21) Appl. No.: 14/852,009

(22) Filed: Sep. 11, 2015

(65) Prior Publication Data

US 2016/0069355 A1 Mar. 10, 2016

Related U.S. Application Data

(63) Continuation-in-part of application No. 14/843,502, filed on Sep. 2, 2015, now abandoned.

(30) Foreign Application Priority Data

Sep. 8, 2014 (DE) .................. 10 2014 217 884

(51) Int. Cl.
*F02C 3/04* (2006.01)
*F04D 29/02* (2006.01)
(Continued)

(52) U.S. Cl.
CPC .............. *F02C 3/04* (2013.01); *F01D 5/025* (2013.01); *F01D 5/066* (2013.01); *F01D 11/008* (2013.01);
(Continued)

(58) Field of Classification Search
CPC .......... F01D 11/005; F01D 5/22; F01D 25/28; F01D 5/025; F01D 5/066; F01D 11/008;
(Continued)

(56) References Cited

U.S. PATENT DOCUMENTS 5,049,035 A * 9/1991 Marlin .................. F01D 5/22
416/193 A
8,246,310 B2 * 8/2012 Pierrot .................. F01D 5/323
416/220 R
(Continued)

FOREIGN PATENT DOCUMENTS

EP 1013886 A2 6/2000
EP 2253802 A2 11/2010
(Continued)

OTHER PUBLICATIONS

European Search Report dated Feb. 24, 2016 for counterpart European application No. 15183543.6.
(Continued)

*Primary Examiner* — Dwayne J White
*Assistant Examiner* — Justin A Pruitt
(74) *Attorney, Agent, or Firm* — Shuttleworth & Ingersoll, PLC; Timothy J. Klima

(57) ABSTRACT

An aircraft gas turbine with a fan disk on which are fastened fan blades spread over the circumference and forming an intermediate space with one another, with a sealing disk arranged at the rear of the fan disk and with an inlet cone mounted at the front of the fan disk, as well as with filler elements arranged in the intermediate spaces, where the sealing disk has an annular groove and where the filler elements are at the rear inserted into the annular groove and at the front held underneath a rim area of the inlet cone, characterized in that the filler elements are designed as bending beams and that on the radially inner side of the filler element at least one rib-like reinforcing area is provided, extending in the axial direction and longitudinally to the filler element.

14 Claims, 10 Drawing Sheets

Figure 1:
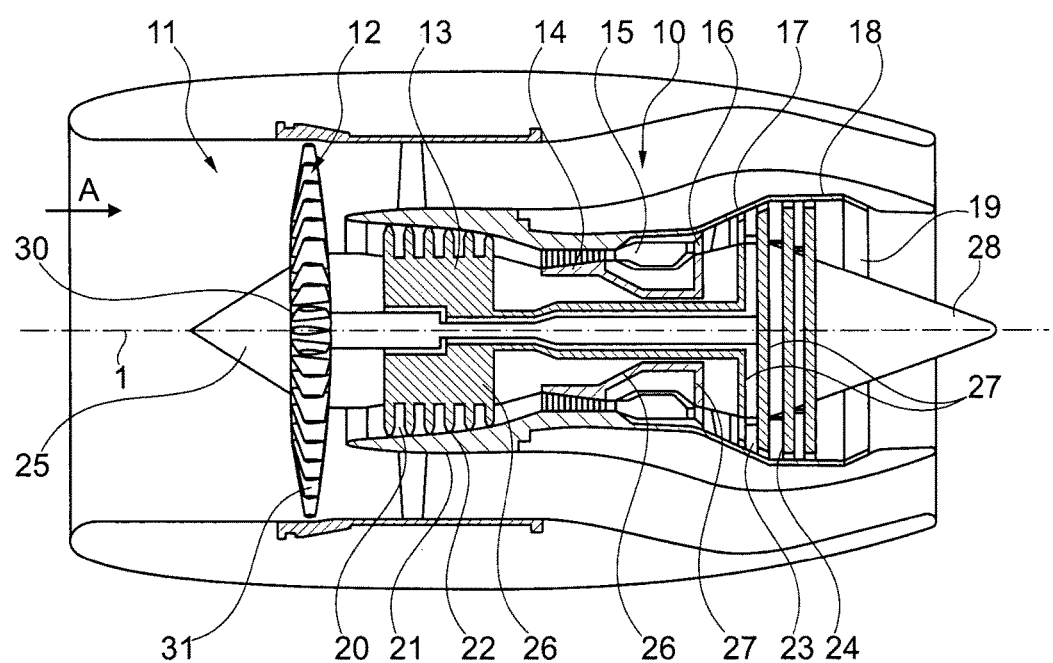

(51) Int. Cl.
  *F01D 11/00* (2006.01)
  *F04D 29/32* (2006.01)
  *F01D 5/02* (2006.01)
  *F01D 5/06* (2006.01)
  *F02K 3/06* (2006.01)

(52) U.S. Cl.
  CPC .............. *F02K 3/06* (2013.01); *F04D 29/023* (2013.01); *F04D 29/321* (2013.01); *F05D 2220/36* (2013.01); *F05D 2240/126* (2013.01); *F05D 2300/43* (2013.01); *F05D 2300/603* (2013.01); *Y02T 50/672* (2013.01); *Y02T 50/673* (2013.01)

(58) Field of Classification Search
  CPC . F02C 3/04; F02K 3/06; F04D 29/023; F04D 29/321; F05D 2220/36; F05D 2240/126; F05D 2300/43; F05D 2300/603
  See application file for complete search history.

(56) References Cited

U.S. PATENT DOCUMENTS

| | | | | |
|---|---|---|---|---|
| 8,777,576 | B2 * | 7/2014 | Kray | ................. F01D 5/3007 416/190 |
| 2005/0265847 | A1 * | 12/2005 | Butt | ........................ F01D 5/02 416/204 R |
| 2008/0226458 | A1 | 9/2008 | Pierrot et al. | |
| 2009/0269202 | A1 * | 10/2009 | Borzakian | ............... F01D 5/027 416/220 R |
| 2011/0305577 | A1 | 12/2011 | Rivers et al. | |
| 2012/0148388 | A1 * | 6/2012 | Bottome | ............... F01D 11/008 415/170.1 |
| 2012/0244003 | A1 * | 9/2012 | Mason | ................. F01D 11/008 416/219 R |
| 2013/0266447 | A1 | 10/2013 | Evans et al. | |

FOREIGN PATENT DOCUMENTS

| | | |
|---|---|---|
| EP | 2463482 A2 | 6/2012 |
| EP | 2594773 A2 | 5/2013 |
| FR | 2918409 A1 | 1/2009 |
| GB | 2363170 A | 12/2001 |

OTHER PUBLICATIONS

German Search Report dated May 8, 2015 from counterpart App No. 10 2014 217 884.3.

* cited by examiner

State of the art

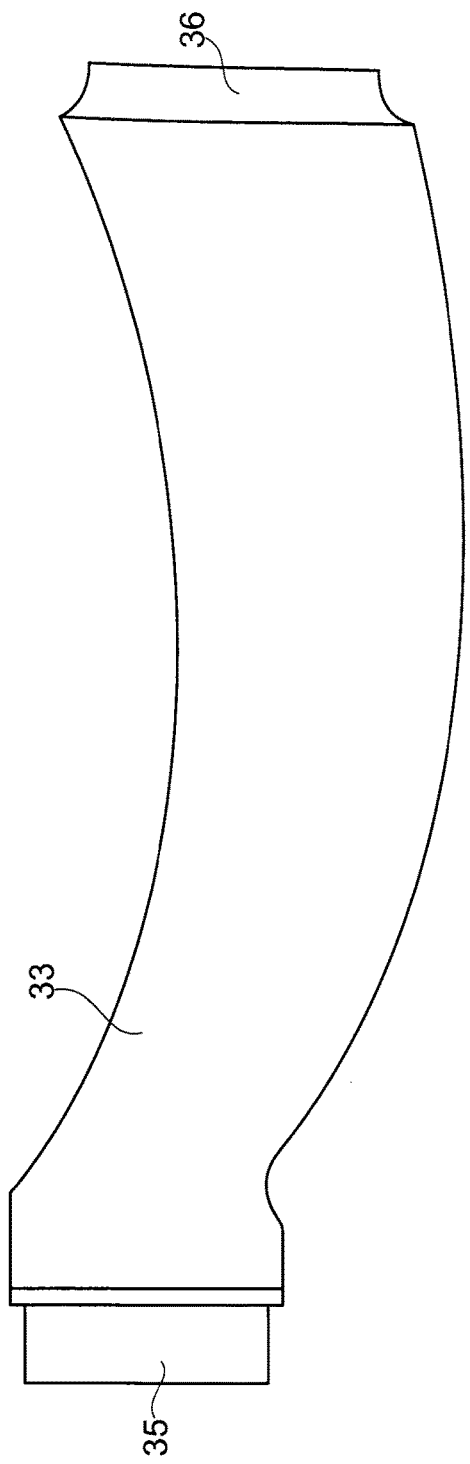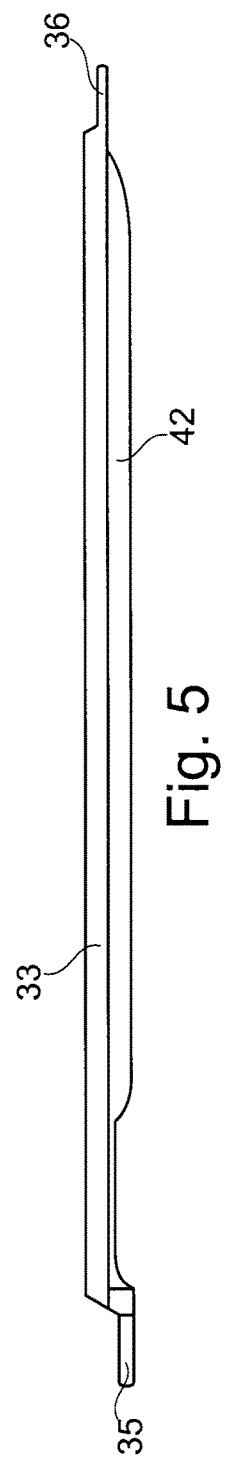
Fig. 4
Fig. 5

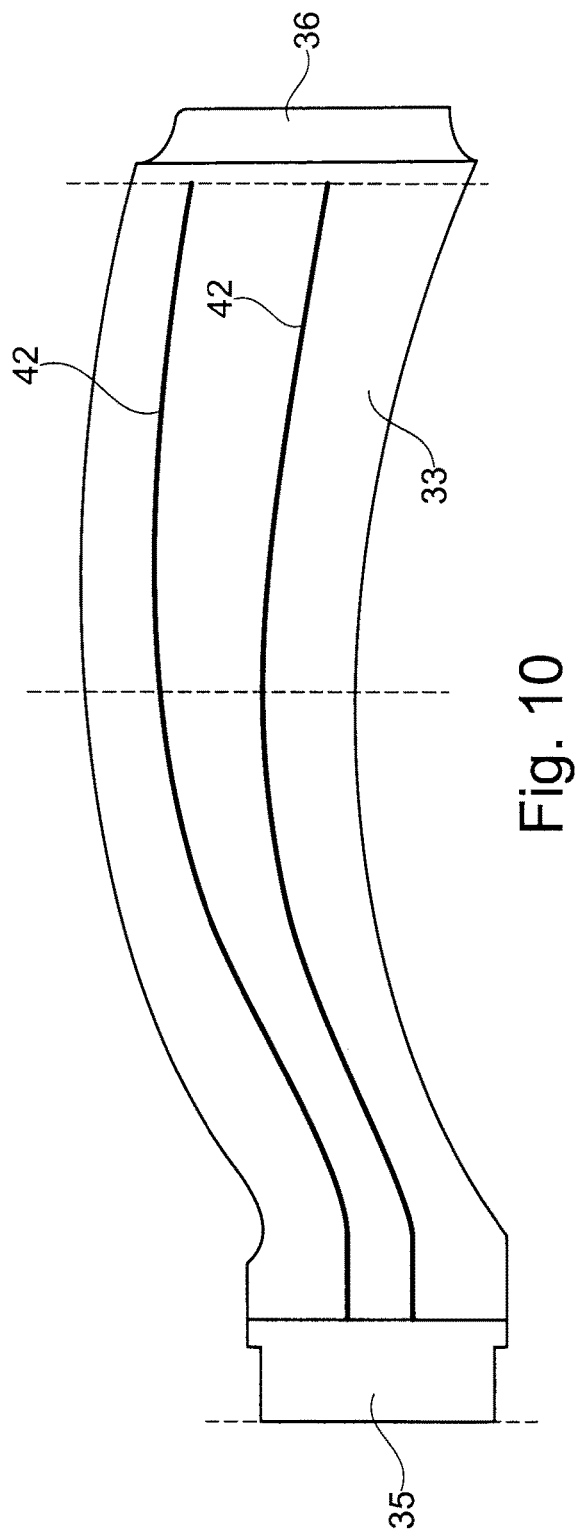
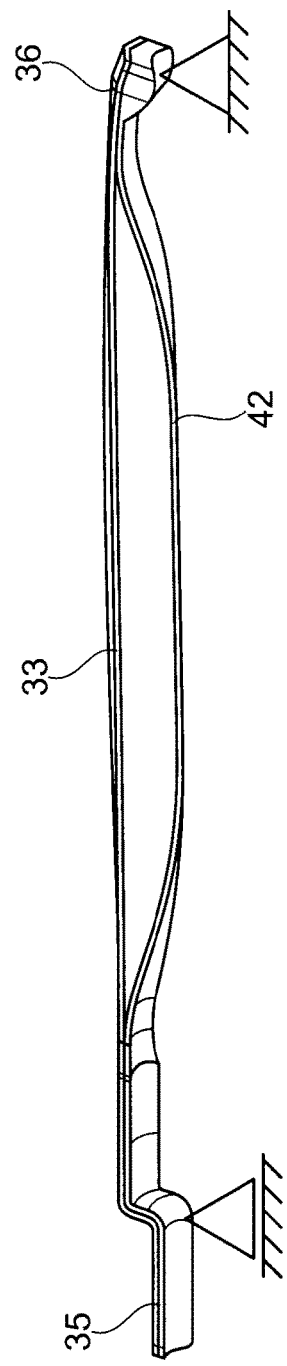
Fig. 10
Fig. 11

PANELS OF A FAN OF A GAS TURBINE

This application is a continuation-in-part of U.S. patent application Ser. No. 14/843,502 filed Sep. 2, 2015, which claims priority to German Patent Application DE102014217884.3 filed Sep. 8, 2014. The entirety of both applications are incorporated by reference herein.

This invention relates to filler elements of a fan of a gas turbine and in particular to an aircraft gas turbine in accordance with features disclosed herein.

In detail, the invention relates to an aircraft gas turbine with a fan disk on which are fastened fan blades spread over the circumference and forming an intermediate space with one another, with a sealing disk arranged at the rear of the fan disk and with an inlet cone mounted at the front of the fan disk, as well as with filler elements arranged in the intermediate spaces.

For the state of the art, reference is made to GB 2 363 170 A. The state of the art shows designs in which the filler element (annulus filler) is a separately manufactured component usually made of aluminum and suspended from the fan disk by means of hooks. The task of the filler element is to form the radially inner wall of the flow duct in the intermediate spaces between the fan blades and to permit an undisturbed flow. In so doing, the filler elements must in particular satisfy the mechanical requirements, for example with regard to centrifugal forces. Manufacture of the filler elements is cost-intensive due to their design structure. Moreover, the filler elements have a relatively high weight. Sealing is achieved by means of organic sealing lips which must also be separately produced. Due to the suspension from the fan disk by means of hooks, it is necessary to perform expensive manufacturing steps on the fan disk itself. Particularly when the latter is produced as a forging, the blank forging has initially a considerably higher weight and must then be machined to make the hook areas. The overall result is thus structural elements which are very cost-intensive and entail a high weight.

US 2013/0266447 A1 discloses filler element designs of a fan disk. It provides a filler element which in the axial direction, relative to the rotary axis of an aircraft gas turbine, is provided with a projection on both its front and rear sides. Said projection is in each case inserted into a groove on the rear area of the inlet cone or of a sealing disk. A relatively large clearance is provided here, which on the one hand makes assembly more difficult and on the other hand does not ensure sufficient fixing of the filler element itself.

The object underlying the present invention is to provide a fan of an aircraft gas turbine, which while being simply designed and easily and cost-effectively producible avoids the disadvantages of the state of the art and is provided with optimized filler elements.

It is a particular object to provide a solution to the above problems by a combination of features as disclosed herein. Further advantageous embodiments will become apparent from the present disclosure.

In accordance with the invention, it is thus provided that the sealing disk has an annular groove and that the filler elements are at the rear inserted into the annular groove and at the front held underneath a rim area of the inlet cone.

It is furthermore provided in accordance with the invention that the filler element is designed as a bending beam and that on the radially inner side of the filler element at least one rib-like reinforcing area is provided, extending in the axial direction relative to the engine axis of the aircraft gas turbine and longitudinally to the filler element. A bending beam structure is therefore provided in accordance with the invention which affords maximum mechanical strength with a low structural volume. This is particularly advantageous in view of the high speeds and the fan forces that these entail. The filler element thus has a high inherent stiffness and yet is designed such that the front and the rear fastening areas can have a simple and space-saving design. This simplifies assembly of the filler element, allowing it to be integrated into existing designs.

Due to the design in accordance with the invention, the filler elements are no longer mounted, as in the state of the art, on the fan disk, so that the latter does not need to be provided with any holding means or similar. This considerably reduces the weight of the fan disk. The weight reduction can be up to 10 kg. In addition, the manufacturing costs for the fan disk are considerably reduced.

For mounting the filler elements at the rear (relative to the flow direction) it is only required in accordance with the invention that an annular groove, for example, be made in the sealing disk. This can be done during the machining of the sealing disk, which is required in any event, without additional and expensive measures being required. The making of the annular groove in the sealing disk does not entail any additional weight. The front mounting of the filler elements can be achieved by means of the inlet cone, without the design of the latter having to be substantially altered. This too contributes to a considerable cost reduction.

The reinforcing area is in accordance with the invention preferably designed in one piece with the filler element. It can be rib-like or web-like in the axial direction or run substantially in the axial direction of the filler element. The latter is thus reinforced in its longitudinal direction in order to obtain the required bending strength. In accordance with the invention, one or more reinforcing areas can be provided. In the case of more than one reinforcing areas, they can run parallel to one another. In a favourable embodiment of the invention, it is also possible to design the reinforcing area as a hollow section. This means that the filler element itself is designed at least in a center area as a box or as a hollow section. In so doing, it is particularly simple to take account of specific structural conditions, in particular of the design of the fan disk, which does not have to be modified in order to use the filler elements in accordance with the invention. Due to the arrangement of the reinforcing area, it is possible to optimally adapt the filler element to the respective requirements. In view of the bending beam design, it is thus possible in accordance with the invention to reinforce those areas of the filler element which are subjected to particularly high loads. The reinforcing area can therefore be provided, as already mentioned, either only in a center area of the filler element or over its entire length or over its entire width. Hence the front and the rear insertion areas and lateral edge areas can be designed with a lower and non-reinforced thickness, in particular in order to simplify assembly too.

The filler elements are preferably designed as plastic injection-moulded parts or as continuous fiber-reinforced composite parts. This makes it possible to adapt the filler elements in simple manner to the complex geometry of the intermediate spaces predetermined by the curvature of the fan blades. It is thus possible to manufacture the filler elements for precise fitting, so that additional sealing can be dispensed with. If the organic seals are not dispensed with, they can also be inserted into the mould and be integrally connected during injection moulding, RTM or compression moulding.

The filler elements are designed, as already mentioned, as bending beams in order to afford sufficient stability against the centrifugal forces occurring. The material selection in accordance with the invention plays a major role here, since the filler elements can be manufactured with a very low weight when one of these materials is used. This reduces the centrifugal forces occurring, so that less deformation of the filler elements occurs.

In a particularly advantageous embodiment, it is provided that the filler elements have at the front a hook area permitting a hooked engagement underneath the inlet cone. The filler elements are preferably provided at the rear with an insert projection which is in particular designed such that it results in a clamp-fit during insertion into the annular groove of the sealing disk. This simplifies assembly very considerably, since the individual filler elements can be inserted with their insert projections into the annular groove of the sealing disk and held in this position by the clamp-fit until the inlet cone is fitted.

The filler elements can be made preferably out of a fiber-reinforced plastic. Both glass fibers and carbon fibers can be used here. With an injection moulding process, shorter fibers can be used, while in compression moulding longer reinforcing fibers can be used. A further variant is manufacture with continuous fiber reinforcement using the so-called RTM (Resin Transfer Moulding) process, whereby the highest mechanical strengths are attained at justifiable cost.

Figure 2:
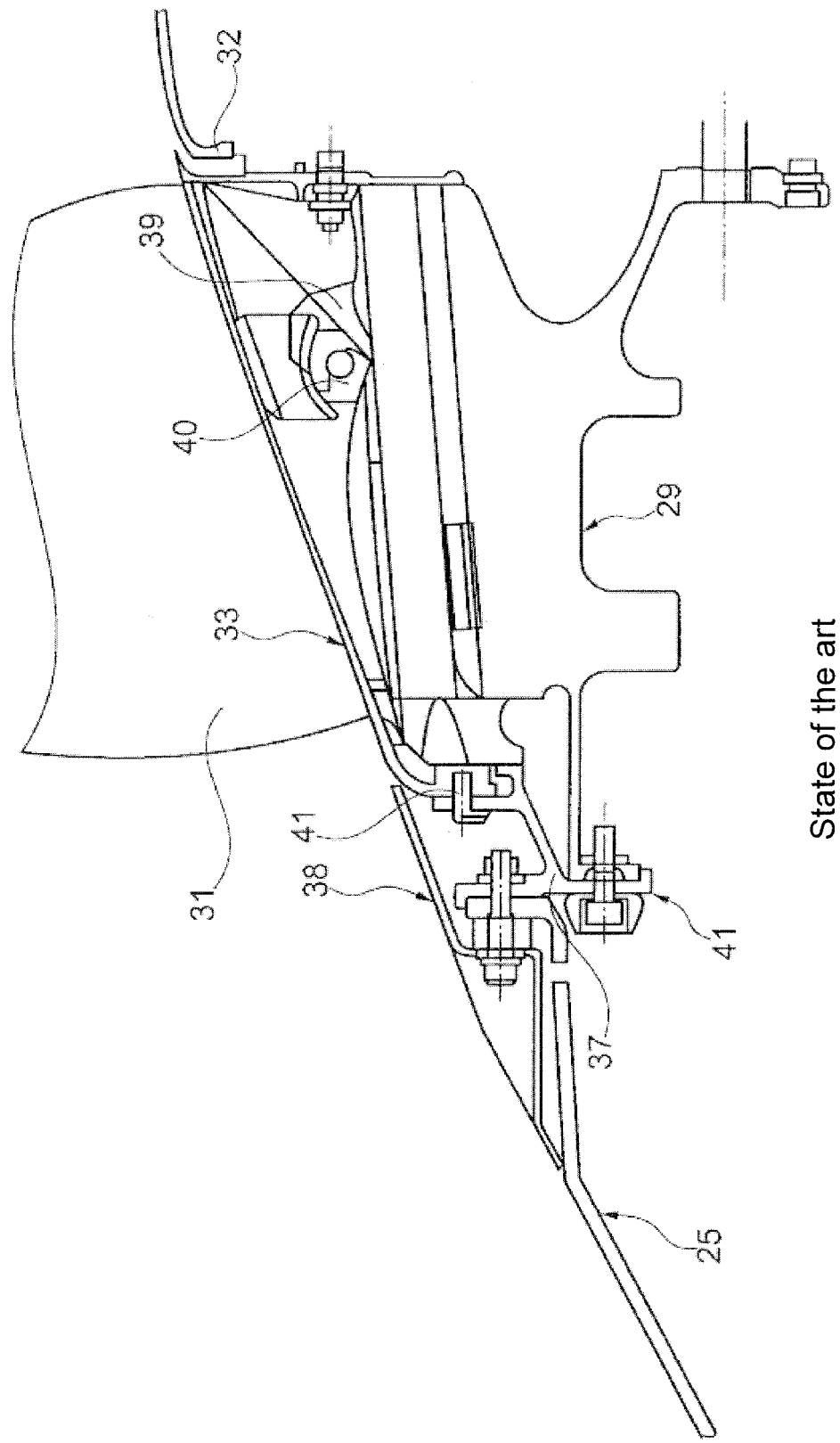
Figure 3:
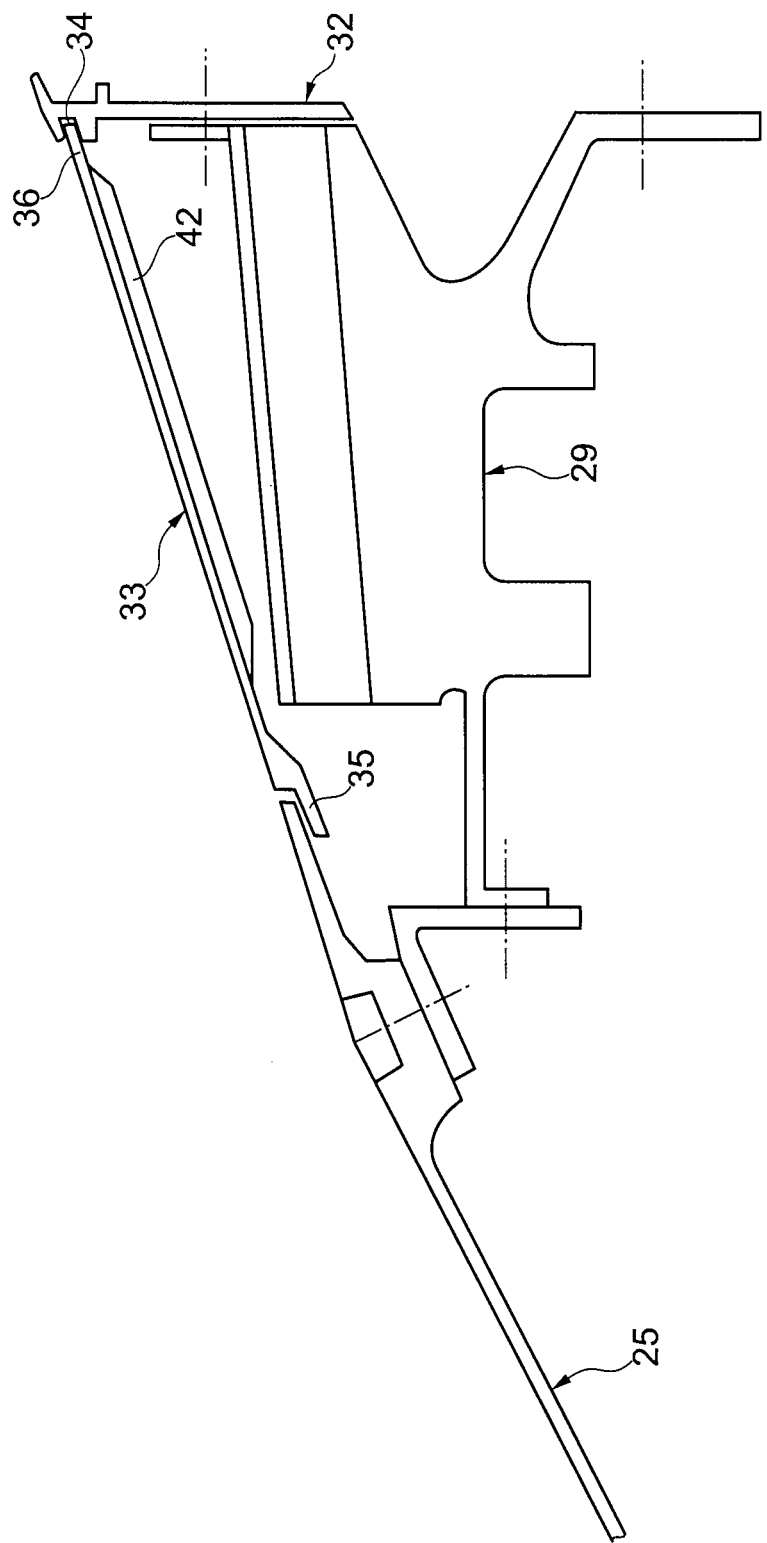
Figure 6:
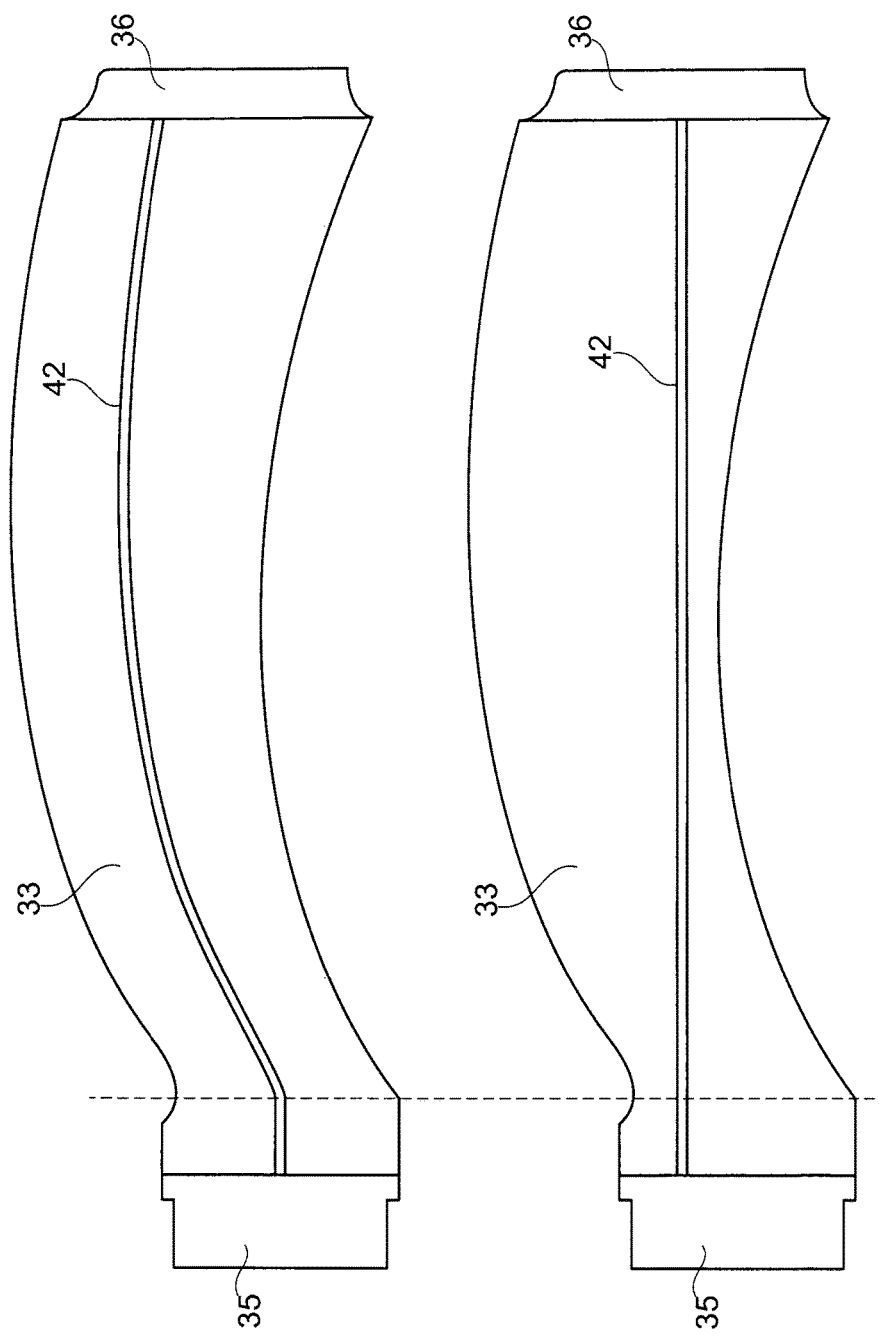
Figure 7:
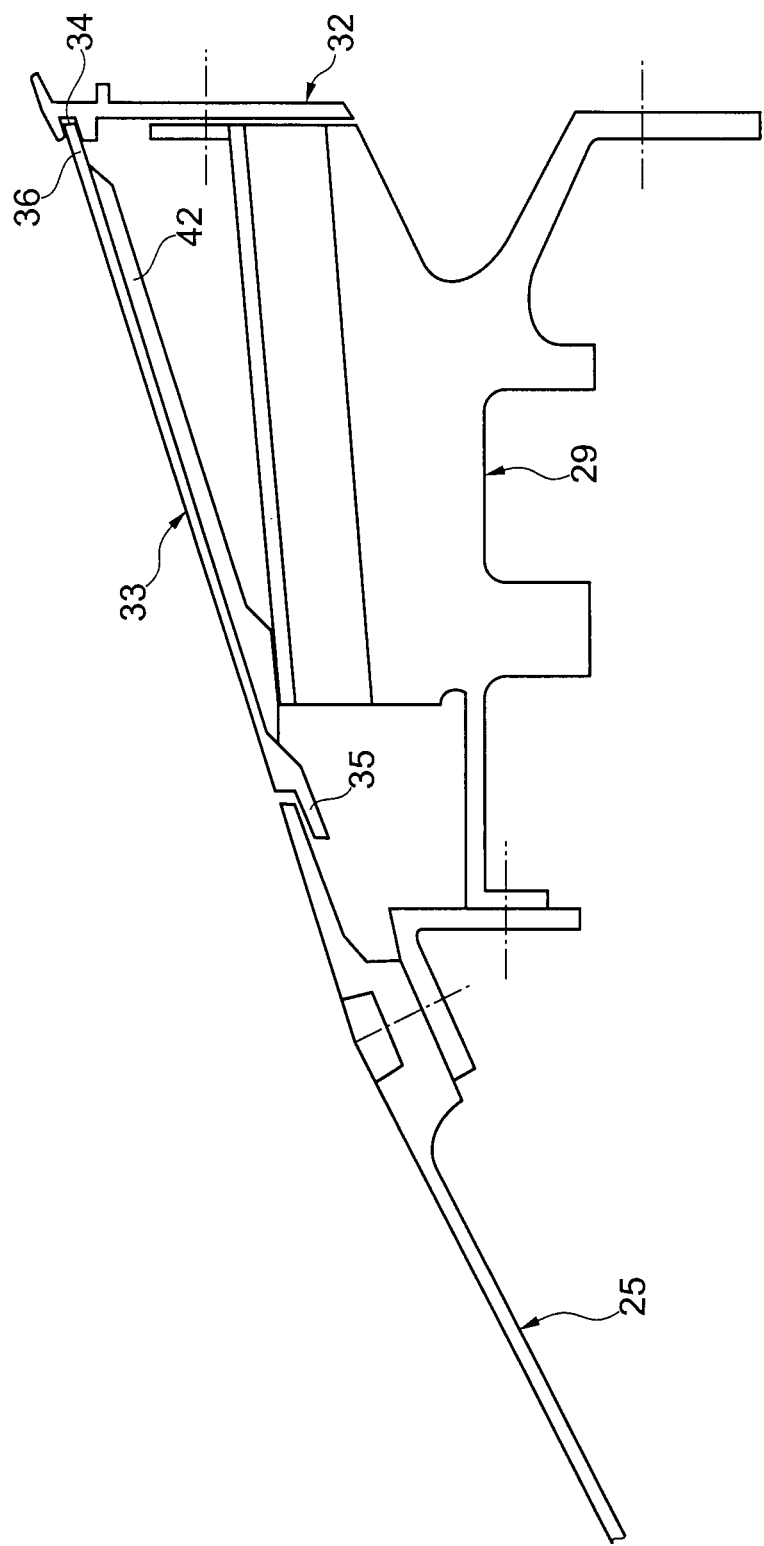
Figure 8:
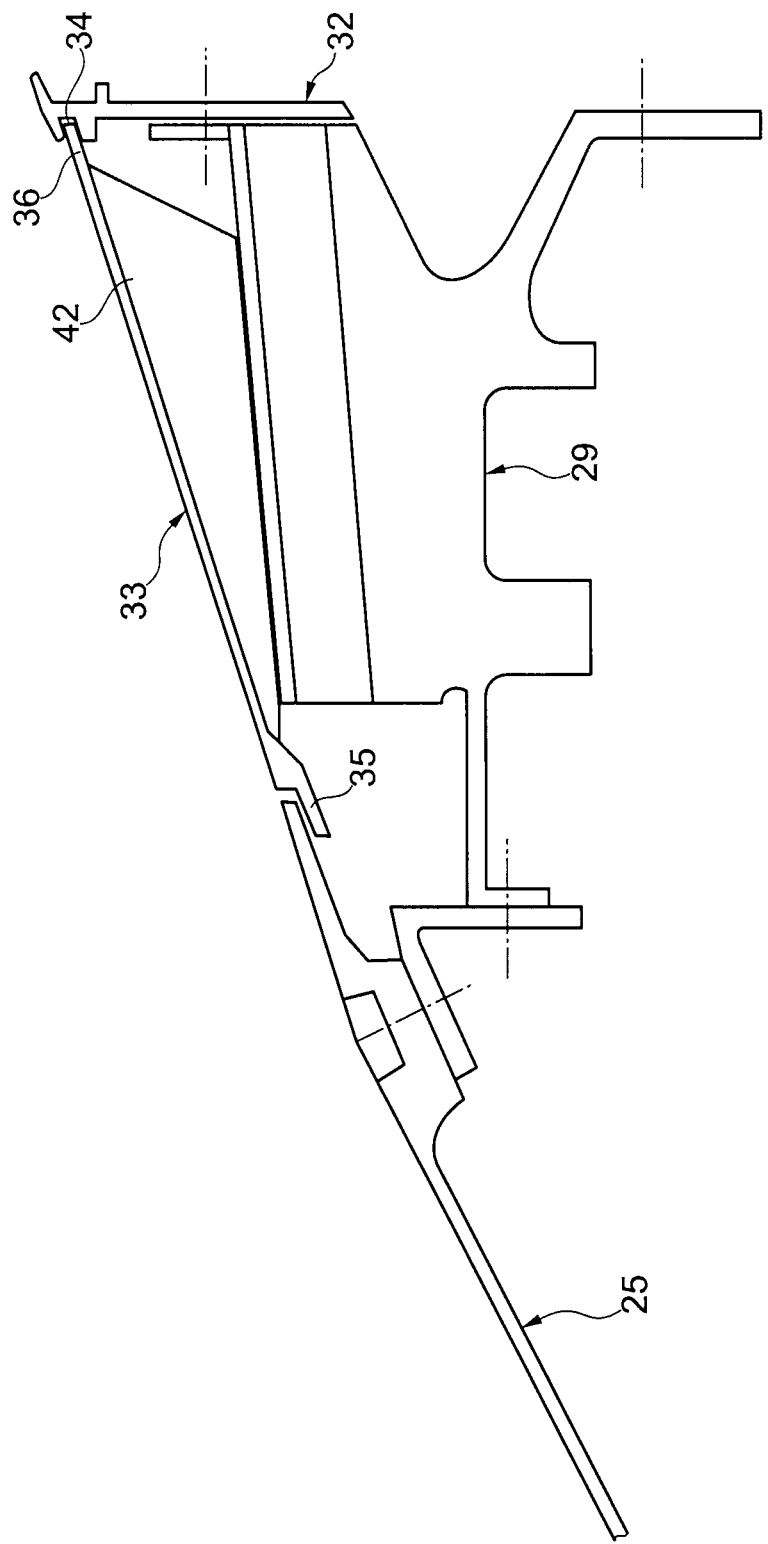
Figure 9:
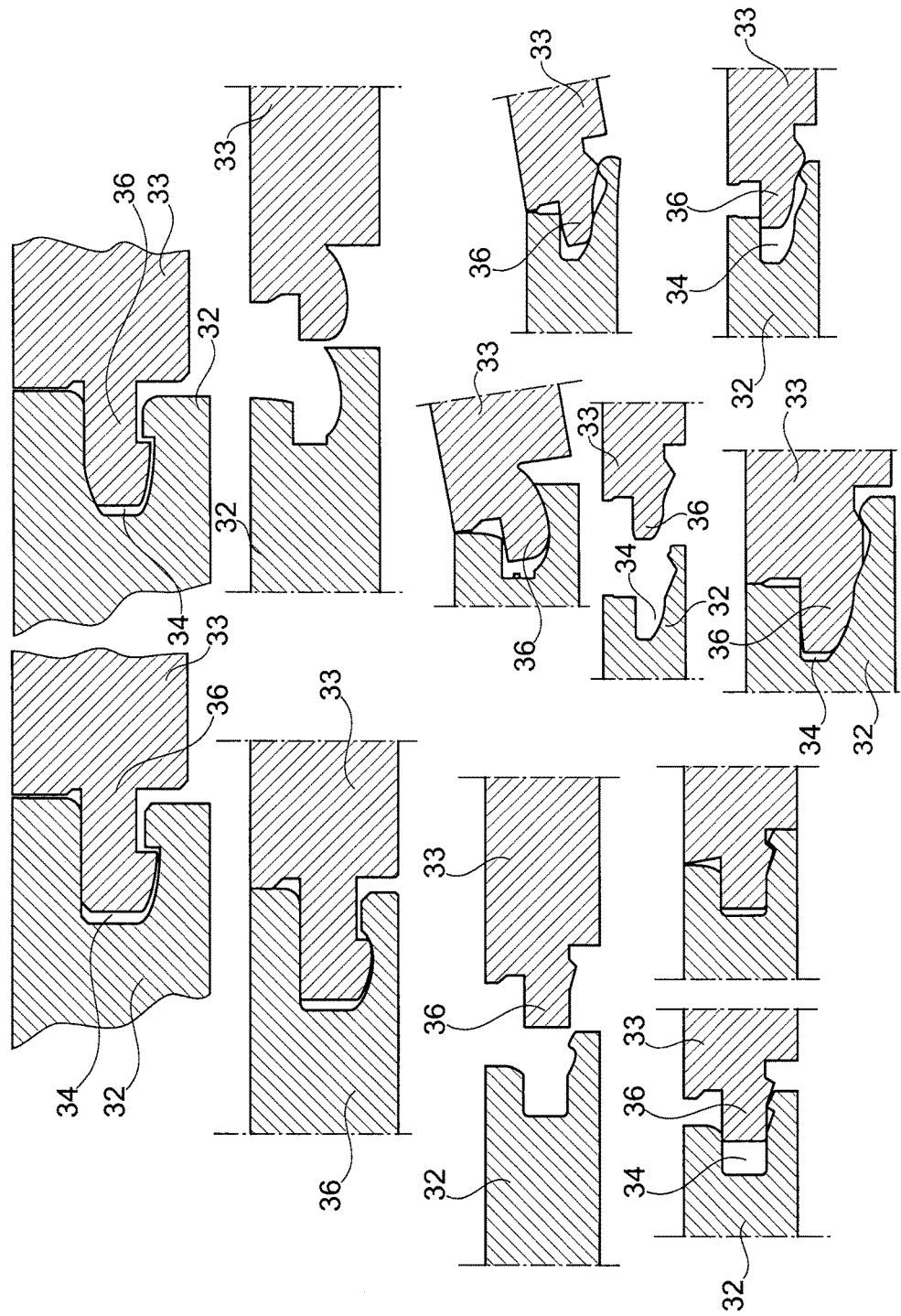
Figure 12:
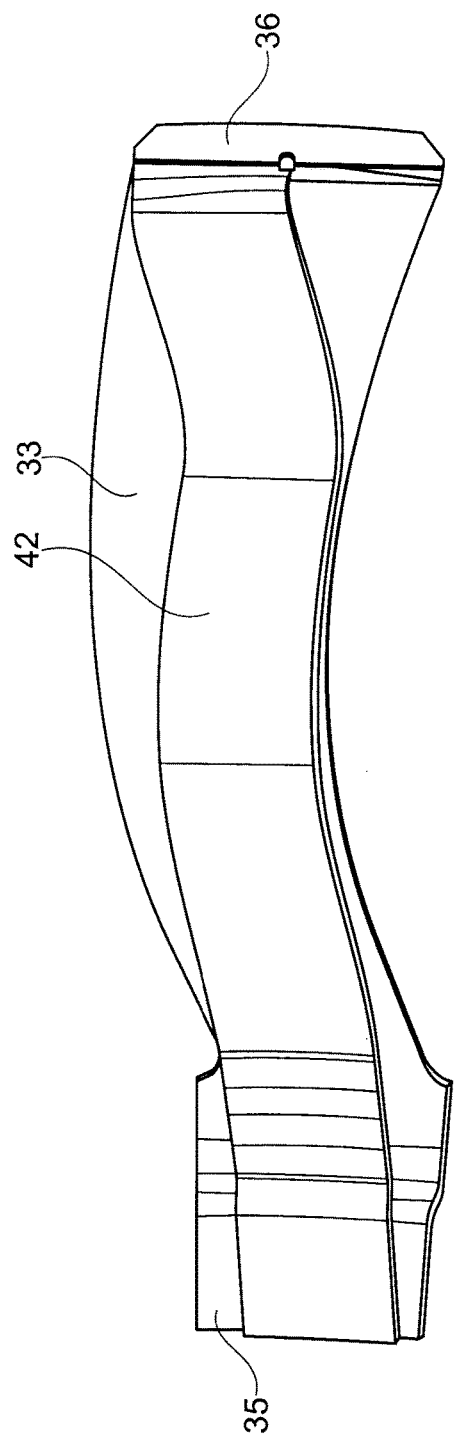
Figure 13:
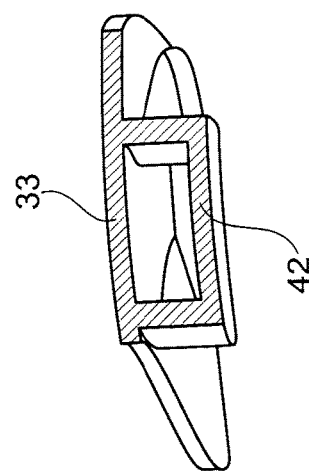

The present invention is described in the following in light of the accompanying drawing showing an exemplary embodiment. In the drawing, FIG. 1 shows a schematic representation of a gas-turbine engine in accordance with the present invention, FIG. 2 shows a simplified sectional view of filler elements in accordance with the state of the art, FIG. 3 shows a sectional view, by analogy with FIG. 2, of an exemplary embodiment in accordance with the present invention, FIGS. 4-6 show views of a filler element in accordance with FIG. 3, in top view, side view and bottom view, FIGS. 7 and 8 show views, by analogy with FIG. 3, with modified filler elements, FIG. 9 shows embodiments of the annular groove of the insert projections, FIG. 10 shows a bottom view of a further exemplary embodiment by analogy with FIG. 6, FIG. 11 shows a schematic side view, illustrating the bending beam construction and a box-shaped reinforcing area, FIG. 12 shows a bottom view, by analogy with FIGS. 6 and 10, of an exemplary embodiment with a box-shaped reinforcing area, and FIG. 13 shows a sectional view of the exemplary embodiment of FIG. 12.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows in a simplified axial sectional view a filler element in accordance with the state of the art as well as the fastening of the filler element.

FIG. 2 shows in particular an inlet cone 25 fastened to a front retaining ring 37. A front ring-like cowling 38 is provided to cover the fastening area.

A fan disk 29 supports, spread over its circumference, several fan blades which (see FIG. 1) form an intermediate space 30. Said intermediate space 30 is closed by means of filler elements 33.

A sealing disk 32 is arranged at the rear of the fan disk 29.

The fan disk 29 is provided with a plurality of hooks 39 spread over the circumference and into which fastening hooks 40 are inserted that are provided on the individual filler elements 33. The filler elements are for example made of aluminum. The front area of the filler elements 33 is fastened to the front retaining ring 37 by means of a bolted connection 41, to prevent any detachment of the hooks 39 and of the fastening hooks 40.

In the following exemplary embodiments, identical parts are provided with the same reference numerals each.

FIG. 3 shows in simplified sectional view, by analogy with FIG. 2, a first exemplary embodiment of the present invention. An illustration of the fan blades 31 was dispensed with. It can be seen that the fan disk 29 can be of very simple design in terms of the fastening of the filler elements 33. The rear sealing disk 32 has an annular groove 34 which can be simply manufactured by metal cutting during the machining of the sealing disk 32. The filler element 33, which is for example manufactured as a plastic injection-moulded part, has at its rear end an insert projection 36 which can be inserted by means of a clamp-fit into the annular groove 34 and forms a rear snap-in lip. The filler element 33 is provided at its front area with a hook area 35 extending over its width. The filler element 33 is held underneath the rim of the inlet cone 25 by means of the hook area 35.

FIG. 9 shows widely differing design variants of the rear insert projection 36. It can be seen here that for assembly the filler element 33 is inserted into the annular groove 34 of the sealing disk 32 and anchored and held there. It is obvious that the different design variants of FIG. 9 are not restrictive for the invention, and that a simple clamping construction is also possible.

On its bottom side, the filler element 33 is provided with a reinforcing area 42 which can for example be designed rib-like and/or reinforced with fibers. One to ten such reinforcing areas can be provided, and are designed parallel to one another or arc-shaped.

FIG. 4 shows a top view onto an inventive filler element 33 in accordance with a first design variant. The complex geometry resulting from the curvature of the fan blades 31

(not illustrated) is shown in particular here. The surface of the filler element 33 is provided with an aerodynamically optimized surface.

FIG. 5 shows a side view, illustrating the reinforcing area 42 in particular. It can be seen overall that the filler element 33 can be produced in a weight-saving manner. Various designs of the reinforcing area 42 are explained in detail using the following exemplary embodiments. FIG. 5 already shows that the reinforcing area 42 extends preferably over a center area of the filler element 33, so that the latter has sufficient strength as a bending beam. This is further explained in the following in particular in conjunction with the exemplary embodiment of FIG. 11.

FIG. 6 shows two bottom views of modified exemplary embodiments from which it can be seen that one to ten web-like reinforcing areas 42 are provided in the exemplary embodiment, where the reinforcing area 42 can be arc-shaped (top illustration) or straight and axis-parallel (bottom illustration). FIG. 10 shows a further design variant in which two web-like reinforcing areas 42 are provided. They extend substantially parallel to one another, with the curvature or arc-shaped embodiment following the outer contour of the lateral surfaces of the filler element 33. The two reinforcing areas 42 are arranged parallel to one another adjacent to the hook area 35 and substantially in the axial direction relative to the engine axis. With these design variants of FIGS. 6 and 10, the reinforcing areas 42 are designed in one piece with the filler element 33 and in the form of ribs.

FIGS. 7 and 8 show modified exemplary embodiments of the filler elements 33 and of the reinforcing areas 42 by analogy with FIG. 3. In FIG. 7, there is a shorter distance between the reinforcing area 42 and the fan disk 29, and a front part of the reinforcing area 42 is in contact with the fan disk 29. In FIG. 8, the reinforcing area 42 is in contact with the fan disk 29 over its full length. This prevents damage from the impact of parts or in the event of a bird strike, and deformations of the reinforcing area are reduced.

FIG. 11 illustrates the bending beam construction in accordance with the invention. It is shown that in the area of the rear insert projection 36 the filler element 33 is in a fixed mounting. Reference is again made here to the different design variants according to FIG. 9. The insert projection 36 is thus firmly anchored to the sealing disk 32. At the front area, on which the hook area 35 is provided, a minor relative movement is possible, in particular in the axial direction and/or in the radial direction.

FIG. 11 furthermore shows that the reinforcing area 42 can be designed as a hollow section or box section. This considerably increases the overall stiffness of the filler element 33. This is an advantage not only with regard to the centrifugal forces or centripetal forces occurring, but also with regard to the impact of foreign bodies, for example in the event of a bird strike.

FIG. 12 shows a further exemplary embodiment in a bottom view, by analogy with FIGS. 6 and 10. In particular, it illustrates the box section of the reinforcing area 42 as shown in FIG. 11. As already shown by the illustration in FIG. 11, it is possible in accordance with the invention to construct the filler element 33 from at least two layers. The outer layer forms the actual filler element 33 while the radially inner layer forms the wall of the reinforcing area 42. It is shown in FIG. 12 that different arrangements and embodiments of the reinforcing area 42 permit an optimum adaptation to the bending forces occurring. The sectional view in FIG. 13 illustrates the structure of the box section of the reinforcing area 42. Overall, these designs with a closed and tube-like cross-section lead to a considerable increase in the torsional stiffness of the filler element 33. Normal loads occurring are borne by the filler element 33, in particular by its radially outer shell, while thrust loads are absorbed by the reinforcing area 42. The wave-like course of the reinforcing area 42 (see in particular FIGS. 10 and 12) additionally increases the torsional moment.

The invention therefore describes a lightweight construction for the filler elements, in which the latter are not fastened to the fan disk but are designed as bending beams which are anchored at the front on the inlet cone and at the rear on the sealing disk. The manufacture of hooks on the fan disk is therefore no longer required. Furthermore, both the fan disk and the filler elements can be designed with a greatly simplified geometry and hence manufactured with a lower weight and at lower cost. The sealing disk requires only minor modifications or none at all, since it is only necessary to provide the annular groove. The inlet cone substantially requires no design changes.

Due to the low weight of the filler elements, consequential damage for the gas turbine engine in the event of failure of the filler elements is minor. A further advantage is that the filler elements can be easily replaced after removal of the inlet cone.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Inlet cone
26 Compressor drum or disk
27 Turbine rotor hub
28 Exhaust cone
29 Fan disk
30 Intermediate space
31 Fan blade
32 Sealing disk
33 Filler element
34 Annular groove
35 Hook area
36 Insert projection
37 Front retaining ring
38 Front cowling
39 Hook
40 Fastening hook
41 Bolted connection
42 Reinforcing area

What is claimed is:
1. An aircraft gas turbine comprising:
a fan disk on which are fastened a plurality of fan blades spread over a circumference of the fan disk and forming a plurality of intermediate spaces with one another,
a sealing disk arranged at a rear of the fan disk and including an annular groove, an inlet cone mounted at a front of the fan disk and including a rim area, a plurality of filler elements arranged in the intermediate spaces, the plurality of filler elements having front portions and rear portions, wherein the rear portions of the filler elements are inserted into the annular groove, wherein the front portions of the filler elements are held underneath the rim area of the inlet cone, wherein each of the plurality of filler elements is a bending beam including on a radially inner side thereof at least one ribbed reinforcing area extending in an axial direction and longitudinally to the each of the plurality of filler elements, wherein each of the plurality of filler elements is supported against radially outward movement only by the annular groove and the rim area;

wherein the rear portion of each of the plurality of filler elements includes an insert projection engaging the annular groove of the sealing disk in a clamp-fit;

wherein the front portions of the filler elements have a degree of movement with respect to the rim area of the inlet cone in at least one chosen from the axial direction and a radial direction.

2. The aircraft gas turbine in accordance with claim 1, wherein the reinforcing area is one piece with the each of the plurality of filler elements.

3. The aircraft gas turbine in accordance with claim 1, wherein the at least one ribbed reinforcing area includes a plurality of reinforcing areas.

4. The aircraft gas turbine in accordance with claim 3, wherein the at least one ribbed reinforcing area is a hollow section.

5. The aircraft gas turbine in accordance with claim 4, wherein the at least one ribbed reinforcing area extends over a majority of a length of the each of the plurality of filler elements.

6. The aircraft gas turbine in accordance with claim 1, wherein the at least one ribbed reinforcing area extends over a center area of the each of the plurality of filler elements.

7. The aircraft gas turbine in accordance with claim 1, wherein the plurality of filler elements are at least one chosen from plastic injection-molded parts, continuous fiber-reinforced composite parts, and made of fiber-reinforced plastic.

8. The aircraft gas turbine in accordance with claim 1, wherein the each of the plurality of filler elements includes a hook area at the front portion.

9. The aircraft gas turbine in accordance with claim 1, wherein there is a distance between the at least one ribbed reinforcing area and the fan disk.

10. The aircraft gas turbine in accordance with claim 1, wherein a front part of the at least one ribbed reinforcing area is in contact with the fan disk.

11. The aircraft gas turbine in accordance with claim 1, wherein the at least one ribbed reinforcing area is in contact with the fan disk over a majority of a length of the at least one ribbed reinforcing area.

12. The aircraft gas turbine in accordance with claim 1, wherein the at least one ribbed reinforcing area is a hollow section.

13. The aircraft gas turbine in accordance with claim 1, wherein the at least one ribbed reinforcing area extends over a majority of a length of the each of the plurality of filler elements.

14. The aircraft gas turbine in accordance with claim 1, wherein at least one chosen from the annular groove and the insert portion of each of the plurality of filler elements includes a snap-in lip such that the insert portion of each of the plurality of filler elements engages the annular groove of the sealing disk in a snap-fit.

* * * * *